UNITED STATES PATENT OFFICE 2,270,893

PROCESS OF IMPARTING HYDROPHOBIC PROPERTIES TO FIBROUS MATERIALS

Ludwig Orthner and Gerhard Balle, Frankfort-on-the-Main, and Georg Dittus, Ludwigshafen-on-the-Rhine, Germany, assignors to I. G. Farbenindustrie Aktiengesellschaft, Frankfort-on-the-Main, Germany No Drawing. Application December 10, 1938, Serial No. 245,036. In Germany December 10, 1937

4 Claims. (Cl. 8—113)

The present invention relates to a process of imparting hydrophobic properties to fibrous materials.

We have found that fibrous materials of vegetable or animal origin as well as natural or artificial threads or materials made therefrom may be rendered impermeable to water or water-repellent by treating them with salts of iso-thioureas containing at least once the group —CH₂.X.R or the group

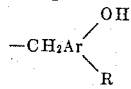

R being a hydrocarbon radical having at least 6 carbon atoms, X being

—O—
—S—

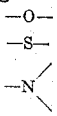

or an atom group containing these elements and Ar being an aromatic radical, and exposing the materials or threads thus treated to the action of heat i. e. temperatures from about 80° C. to about 150° C.

Compounds which are suitable for use in the present invention are, for instance the reaction products of thiourea or an alkyl-, aralkyl-, cyclo-alkyl- or aryl-compound thereof capable of reacting in the iso-form, such as ethyl-thiourea, triethyl-thiourea, benzyl-thiourea, diphenyl-thiourea, cyclo-hexyl-dimethyl-thiourea, phenyl-ethyl-thiourea, ethylene-thiourea, with one of the following halogen-methyl compounds, named as examples: halogen-methyl ethers of mono- or polyhydric alcohols which are obtainable, for instance, according to the process described in British Patent Specification No. 448,796, for instance, dodecyl bromomethyl ether, octadecyl chloromethyl ether, dichloromethyl ether of octadecane-diol, chloromethyl ether of octadecyl-glycol, chloromethyl ether of cresyl-monoglycol, chloromethyl ether of isododecylphenylglycol and chloromethyl ether of iso-octyl-phenyl-triglycol, halogenmethyl ethers of other compounds containing reactive hydroxyl groups such as cyanohydrins, chlorhydrins, hydroxyamines; halogenmethyl thioethers, such as, for instance, octodecyl chloromethyl sulfide, dodecyl chloromethyl sulfide; halogenmethyl compounds from carboxylic acid amides or ureas or urethanes or imido-ethers, which are obtainable, for instance, according to the process described in U. S. patent application Serial No. 243,796 filed Dec. 3, 1938, in the name of Ludwig Orthner, Gerhard Balle, Georg Dittus and Hermann Wagner for: Hydrohalides of substituted iso-thioureae and a process of preparing them, such as N-dodecyl-aceto-chloromethyl amide, lauroylmethyl-chloromethyl amide, stearoyl-chloromethyl amide, iso-octyl-phenoxy-acetic acid chloromethylamide, the chloromethylamide of hydroxy-stearic acid from hardened castor oil, the chloromethyl compounds of dichloro-stearic acid amide, N-stearyl-N-chloromethyl-urethane, O-stearyl-N-methyl-N-chloromethyl-urethane, dichlorostearyl-N-chloromethyl-urethane; stearoyl-chloromethyl-imino ether (prepared by reaction of formaldehyde and hydrochloric acid upon stearic acid nitrile), octadecyl-chloromethyl-urea; halogenmethyl compounds from aromatic hydroxyl compounds which are obtainable, for instance, according to the process described in the above-mentioned U. S. patent application, such as chloromethyl-isododecyl-phenol, halogenmethyl compounds of para-tertiary octylphenol, halogenmethyl compounds of intermediate products obtained in the alkaline condensation of dodecylphenol with formaldehyde; the chloromethyl compounds of amidoximes, amidines, imidazoles and imidazolines.

The constitution of the above-mentioned compounds may be illustrated by some examples:

(1) Octadecyl-, oxymethyl-isothiourea hydrochloride:

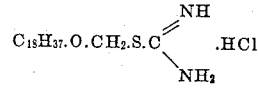

(2) Stearoyl-amidomethyl-isothiourea hydrochloride:

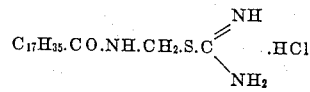

(3) The reaction product of para-tertiary octyl-orthochloromethylphenol and thiourea:

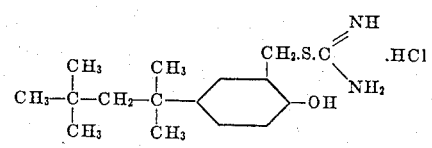

(4) S-stearoyl-amidomethyl-N-dodecyl-oxymethyl-iso-thiourea hydrochloride:

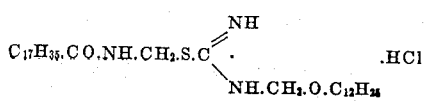

(prepared from stearic acid chloromethyl amide and dodecyl-oxymethylthiourea, the latter being obtained, according to Am. Chem. Journ. 41, page 342, from dodecyl-oxymethyl-isothiocyanate and ammonia).

(5) S-stearoyl-methyliminoether-isothiourea-hydrochloride of the probable formula

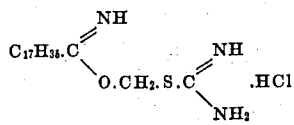

The nature of the acid radical present in the isothiuronium salts is of subordinate importance and does not materially affect the hydrophobic properties. For economical reasons there are in the first line used the chlorides, if desired, in the presence of buffering substances, for instance, sodium acetate, sodium lactate, sodium tartrate, sodium phosphates or the like, if an especial gentle treatment of the textile materials is necessary, in which case the halogen atom is assumed to be in part exchanged for the acid ion of the buffering substance. With practically the same effect there may also be used instead of the chlorides other halides. The salts of other strong acids, such as sulfates, phosphates, perchlorates, are partly more difficultly soluble and their practical use is, therefore, not advantageous.

The use of N-substituted thioureas instead of thiourea generally diminishes the solubility and stability of the isothiuronium salts in water. In order to obtain an especially soft feel of the impregnated material the use of a thiourea substituted at the nitrogen by a high fatty radical for the preparation of the isothiuronium salt is of advantage. In order to obtain a strong water-repellant effect the use of isothiuronium salts containing at least 12 carbon atoms is suitable.

The fibrous materials may be treated by various methods with the compounds named. The salts of iso-thioureas may be used in solution in an organic solvent; alternatively, aqueous solutions or dispersions may be used, if desired, with addition of emulsifying or dispersing agents. The operating temperature may be between 0° C. and 100° C., generally between ordinary temperature and about 60° C. After the treatment, the excess of the liquid used is removed according to one of the usual methods applied in the textile industry, for instance, by centrifuging, pressing, squeezing, or the like. The subsequent drying may be a single operation by means of one of the known drying apparatus at a temperature up to about 150° C., or the material may be preliminarily dried at temperatures up to about 80° C. and then subsequently subjected to a heat-treatment at, for instance, 80° C. to 150° C.

The products used in the present invention may also be applied in admixture with other agents capable of imparting to fibrous materials water-repellant properties, such as paraffin, aluminium stearate, stearic acid anhydride and compounds described, for instance, in British patent specifications Nos. 463,300 and 463,472 and in French patent specification No. 819,945. The treatment of the material may also be combined with other processes; thus various special effects may be obtained by addition to the liquids described above of softening agents, de-lustring agents, agents rendering the material fast to creasing, filling and finishing agents and the like; even after several washing operations such effects are not diminished.

The following examples serve to illustrate the invention, but they are not intended to limit it thereto; the parts are by weight:

(1) Viscose artificial silk crepe is introduced into a bath containing per liter of water 10 grams of the compound obtained from thiourea and octadecylchloromethyl ether. The bath is prepared by first dissolving the thiourea salt, at 50° C., in 40 cc. of alcohol and introducing this solution, while stirring, into the water. The artificial silk crepe is then impregnated, for 30 minutes, in this bath at a temperature of 50° C., then squeezed and dried at 50° C. to 60° C. Thereupon, the fabric is heated for 30 minutes at 110° C. By this treatment the fabric becomes water-repellent. Practically the same effect is obtained if instead of the chloride the isothiuronium bromide is used.

(2) Viscose artificial silk crepe is well moistened by sprinkling or impregnating with a solution of about 2 per cent. strength of the compound prepared from octa-decyl-chloromethyl ether and thiourea in acetone and heated to 130° C. for 15 to 20 minutes in a drying apparatus which allows the vapors of the solvent to escape. The fabric has become water-repellent after this treatment. Practically the same effect is obtained if the isothiuronium bromide is used instead of the said chloride.

(3) Cotton-calico is impregnated for half an hour at 30° C. to 40° C. in a solution containing per liter of water 10 grams of the compound obtained from thiourea and stearic acid chloromethylamide. After squeezing, the fabric is dried at 60° C. and then heated for one hour at 110° C. By this treatment the material becomes waterproof, the water-proofing being stable to washing. Practically the same effect is obtained if the isothiuronium bromide is used instead of the said chloride.

(4) Cotton-calico is well moistened by sprinkling of impregnating with a solution in alcohol of about 1 per cent. strength of the compound prepared from N.N''-triethylthiourea and the chloromethyl compound of the amide from hardened fish oil fatty acid, the iodine number of which is 10 to 15, and then heated to 145° C. for 10 minutes in a drying apparatus which allows the vapor of the solvent to escape. After this treatment the fabric becomes waterproof, the water-proofing being stable to washing.

(5) Dyed viscose artificial silk crepe is impregnated for 20 minutes at 30° C. to 40° C. in a bath containing per liter of water 5 grams of sodium acetate and 10 grams of the compound obtained from stearic acid chloromethyl amide and thiorueA. The material is then squeezed, dried at about 60° C. and heated for half an hour at 110° C. to 120° C. The material thus treated immediately repels water dropped thereon. The fastness to light of the dyeing is not affected.

(6) Wool gabardine is impregnated for half an hour at a temperature of 30° C. to 40° C. with an aqueous solution of 1 per cent. strength of a mixture of 8 parts of the thiourea salt obtained from octadecyl-chloromethyl ether and 2 parts of octadecyl - hydroxymethyl - pyridinium chloride. After squeezing, the whole is heated for one hour at 120° C. The material thus treated is waterproof.

(7) A mixed fabric consisting of wool and artificial silk staple fiber in a proportion of 1:1 is treated, for 30 minutes, with a solution of 60° C. containing per liter of water 10 grams of a mixture of 5 parts of stearic acid methylol amide and 5 parts of the compound obtained from stearic acid chloromethyl amide and thiourea. The fabric is squeezed and subjected to a ripening process at 120° C. The material thus treated is water-proof.

(8) A mixed fabric consisting of cotton and viscose artificial silk staple fiber is impregnated with an aqueous solution of 2 per cent strength of sodium acetate, squeezed and dried. The material is then impregnated, for half an hour, at a temperature of 50° C. with a bath containing per liter of water 10 grams of the thiourea compound of octadecyl-chlormethyl ether. After centrifuging the excess of the liquid used, the fabric is dried at 50° C. to 60° C. and then subjected for one hour to a ripening process at 110° C.

(9) Natural silk is impregnated, for half an hour, at 40° C. with an aqueous solution of 1 per cent. strength of the compound obtained from stearic acid chloromethyl amide and thiourea. After squeezing, the silk is dried at 60° C. and then subjected, for 30 minutes, to a ripening process at 110° C.

(10) Dyed artificial silk crepe is treated, for 20 minutes, with a bath of 40° C. containing per liter of water 20 grams of the compound obtained from thiourea and stearic acid chloro-methyl amide and 150 grams of dimethylol-urea. After squeezing, the material is dried at 40° C. to 50° C. and heated, for 30 minutes, at 120° C. The material thus treated is water-repellent and fast to creasing. The fastness to light of the dyeing has practically not been affected.

(11) 10 grams of S-stearoyl-amidomethyl-N-dodecyl-hydroxy-methyl-isothiourea hydrochloride are dispersed, by means of 1 gram of oleyl-polyglycol ether, at 50° C., in one liter of water. A mixed fabric consisting of cotton and viscose silk staple fiber is impregnated, for 30 minutes, in this bath at a temperature of 50° C. After squeezing, the material is dried at 50° C. and then heated, for one hour, at 110° C. to 120° C. The material thus treated has hydrophobic properties and an especially soft feel.

(12) A cotton fabric is impregnated for 10 minutes in a bath of about 35° C. to 40° C. containing per liter of water 20 grams of the compound obtained from thiourea and octadecyl-chloromethyl ether and 120 grams of a water-soluble condensation product from thiourea and formaldehyde and being rendered feebly acid. After squeezing the material is dried at 40° C. to 50° C. and heated to 120° C. for 30 minutes. The material thus treated is water-proof and fast to creasing.

(13) A mixed fabric from cotton and rayon staple fiber is treated on a foulard at about 30° C. with a solution of 20 grams of the compound prepared from N-butylthiourea and para-octylphenoxy-acetic acid-chloromethyl amide and 150 grams of dimethylolurea in one liter of water which has been rendered feebly acid. The material is squeezed, dried at about 40° C. to 50° C. and then heated for 20 minutes at 130° C. The material thus treated is water-proof and fast to creasing.

(14) A mixed fabric of rayon staple fiber and wool is treated in a solution containing per liter of water 15 grams of a reaction product from dichlorostearoylchloromethylimino ether and methylenethiourea and 100 grams of the trimethylol compound of melamine and 5 grams of tartaric acid. The material is further treated as described in the preceding examples; it becomes water-repellent and fast to creasing.

The dichlorooctadecyl - chloromethyl - imino ether is obtained by the action of para-formaldehyde and hydrochloric acid on 9.10-dichloro-stearic acid nitrile.

(15) A mercerized cotton fabric is treated in a solution containing per liter of water 20 grams of the condensation product of thiourea and the chloromethyl compound of dodecylphenol and 130 grams of a water-soluble condensation product from urea, formaldehyde and ammonium polysulfide and primary sodium phosphate. The material is further treated as described in Example 11; it becomes water-proof and fast to creasing.

(16) Viscose artificial silk crepe is impregnated for 20 minutes at 30° C. to 40° C. in a bath containing per liter of water 10 grams of the compound from thiourea and the reaction product of para-formaldehyde and hydrochloric acid on stearic acid nitrile and 5 grams of sodium lactate, squeezed, dried at about 60° C. and heated for half an hour at 110° C. to 120° C. The material has become water-proof.

(17) Viscose rayon staple fiber fabric is impregnated for 20 minutes at 30° C. to 40° C. with a bath of the kind indicated in Example 5 and then dried. The material is then heated for one hour at 85° C. to 90° C. The fabric becomes water-proof, the water-proofing being stable to washing.

(18) Cotton calico is impregnated at about 40° C. with an aqueous solution containing 10 grams of the compound from O - stearyl - N - chloromethylurethene and thiourea of the formula

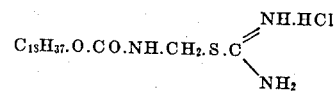

squeezed, pre-dried at about 60° C. and heated for half an hour to 130° C. to 135° C. The material becomes water-proof.

By using for the impregnation an alcoholic solution of about 1 per cent. strength of the chloromethylthiuronium compound of the laurylureidostearic acid amide probably of the following formula

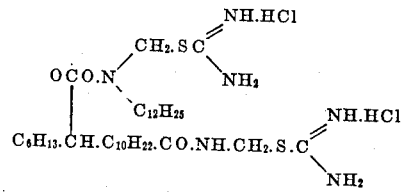

and heating for half an hour at 130° C. to 135° C., the material becomes well water-proof, the water-proofing being stable to washing.

(19) A viscose-rayon staple flibre fabric is impregnated for 20 minutes at 30° C. to 40° C. in an aqueous solution containing per liter of water 30 grams of the condensation product from thiourea and the chloromethyl compound of sym.-adipic acid-dilauryl amide and 25 grams of crystl. sodium acetate, squeezed, dried at about 60° C. and heated to 110° C. to 120° C. The material becomes water-proof.

(20) A cotton fabric is placed for 10 minutes in a bath at about 35° C. to 40° C. containing per liter of water 20 grams of the compound obtainable from thiourea and octadecylchloromethyl ether and 120 grams of a water-soluble condensation product of thiourea and formaldehyde and rendered feebly acid. The material is squeezed, dried at 40° C. to 50° C. and heated for 30 minutes at 120° C. The material thus treated is water-repellent and resistant to creasing.

(21) A mixed fabric from cotton and artificial silk staple fiber is treated on the foulard at about 30° C. with a solution containing 20 grams of the compound obtained from N-butylthiourea and para-octylphenoxyacetic acid chloromethyl amide and 150 grams of dimethylourea per liter of water, and rendered feebly acid. The material is squeezed, dried at about 40° C. to 50° C. and then heated for 20 minutes at 130° C. The material thus treated is water-repellent and resistant to creasing.

(22) A mixed fabric from artificial silk staple fiber and wool is treated with a solution containing per liter of water 15 grams of the product of the reaction of dichloro-octadecyl-chloromethyl-imino ether with methylenethiourea and 100 grams of the trimethylol compound of melamine and 5 grams of tartaric acid. The material is further treated as indicated in the preceding examples. It is water-repellent and resistant to creasing.

(23) A mercerized cotton tissue is treated with a solution containing per liter of water 20 grams of the condensation product from thiourea and the chloromethyl compound of dodecyl phenol and 130 grams of a water-soluble condensation product from urea-formaldehyde and ammonium polysulfide, as well as a primary sodium phosphate. The material is treated as indicated in Example 20; it is water-repellent and resistant to creasing.

We claim:

1. The process of imparting hydrophobic properties to fibrous materials by impregnating the fibrous material in a bath, which contains a salt of a member of the group consisting of isothiourea and isothiourea substituted by hydrocarbon radicals the isothiourea carrying at the sulfur atom a radical of the group consisting of

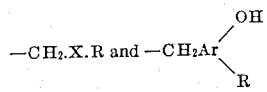

wherein R stands for a hydrocarbon radical of at least 6 carbon atoms, Ar stands for an aromatic radical, X stands for a member selected from the group consisting of O, S, secondary nitrogen, tertiary nitrogen, atom groups containing O and S and N, respectively, squeezing out the impregnated fibrous material, drying it and subsequently heating it to a temperature from about 80° C. to about 150° C.

2. The process of imparting hydrophobic properties to fibrous materials by impregnating the fibrous material in a bath, which contains a salt of isothiourea carrying at the sulfur atom the radical $-CH_2.NH.CO.C_{17}H_{35}$ squeezing out the impregnated fibrous material, drying it and subsequently heating it to a temperature from about 80° C. to about 150° C.

3. The process of imparting hydrophobic properties to fibrous materials by impregnating the fibrous material in a bath, which contains a salt of isothiourea carrying at the sulfur atom the radical

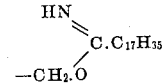

squeezing out the impregnated fibrous material, drying it and subsequently heating it to a temperature from about 80° C. to about 150° C.

4. The process of imparting hydrophobic properties to fibrous materials by impregnating the fibrous material in a bath, which contains a salt of isothiourea carrying at the sulfur atom the radical

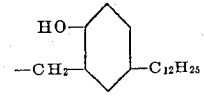

squeezing out the impregnated fibrous material, drying it and subsequently heating it to a temperature from about 80° C. to about 150° C.

LUDWIG ORTHNER.
GERHARD BALLE.
GEORG DITTUS.